Oct. 23, 1956 C. R. PATON 2,767,977
MOTOR VEHICLE REAR WHEEL SUSPENSION MOUNT
Original Filed Nov. 5, 1951
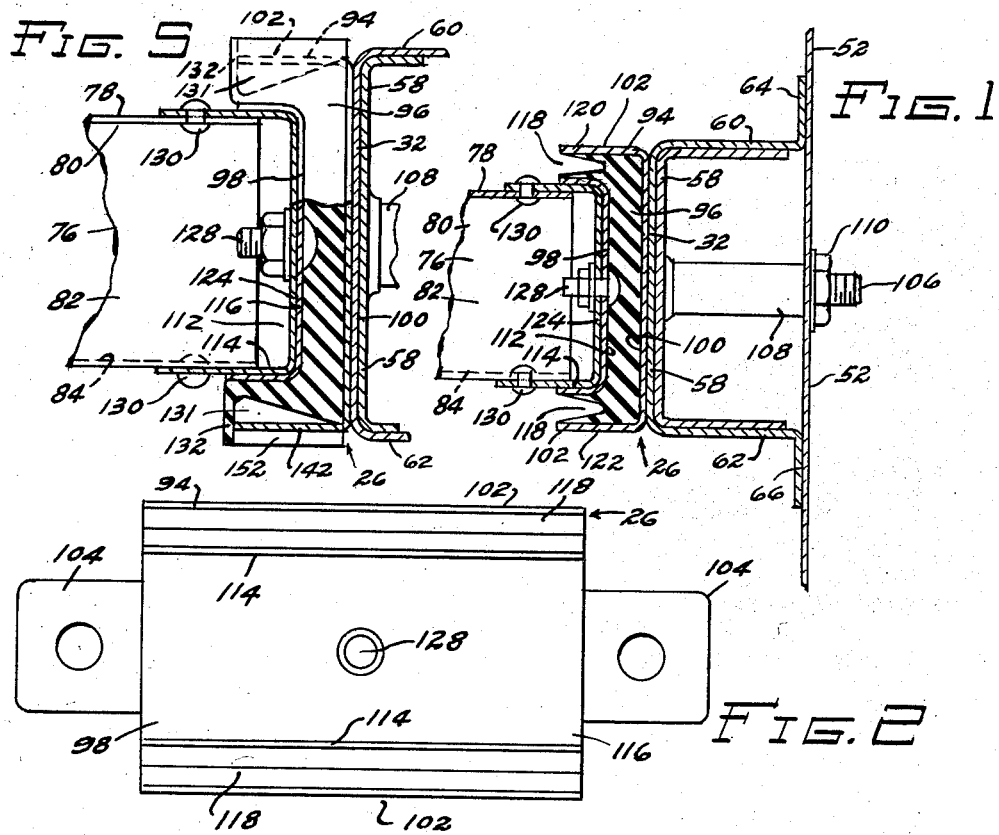
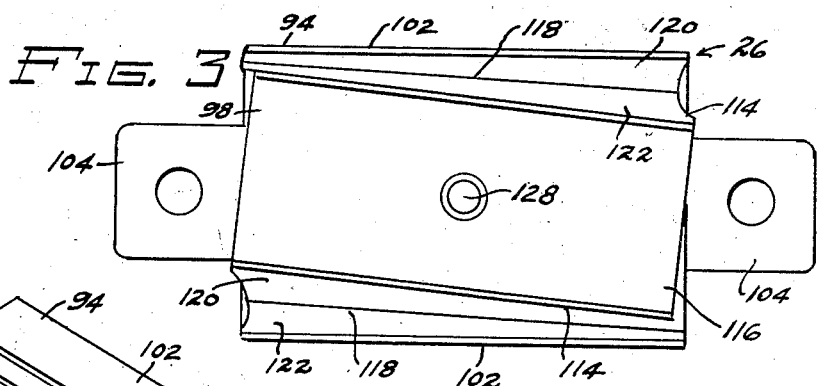
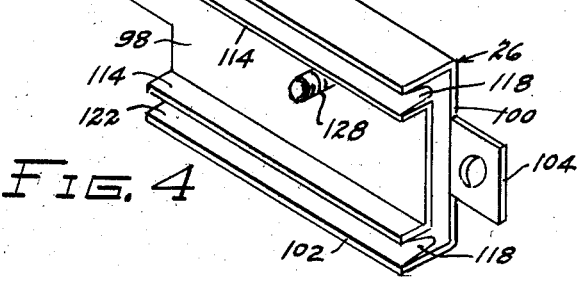
INVENTOR.
Clyde R. Paton.
BY
Wallace P. Lamb
Attorney

United States Patent Office 2,767,977
Patented Oct. 23, 1956

2,767,977

MOTOR VEHICLE REAR WHEEL SUSPENSION MOUNT

Clyde R. Paton, Birmingham, Mich.

Original application November 5, 1951, Serial No. 254,867. Divided and this application August 31, 1953, Serial No. 377,508

1 Claim. (Cl. 267—30)

This invention relates generally to automobiles and particularly to rear wheel suspension mountings therefor.

This application is a division of my copending application for Motor Vehicle Rear Wheel Suspension, filed November 5, 1951, Serial No. 254,867.

In the past, many types of rear wheel spring suspension mechanisms have been proposed for automobiles in an effort to obtain the optimum in noiseless and vibrationless vehicle operation. In addition to vibrations incited in the body by road irregularities, there has been the problem of suppressing audible vibrations incited by clutch chatter in the differential housing, by sudden vehicle acceleration, and by deceleration or sudden braking, particularly in vehicles having the drive through the rear springs. These vibrations, whether they are road induced or whether they originate in the vehicle, are conducted through the rear axle housing and suspension springs to the body. Road induced vibrations and those otherwise incited in the chassis are usually magnified many fold by the body floor pan which acts as a drum, and the resultant noise is, of course, objectionable. In the type of vehicle construction in which the body is separated from a chassis frame by spaced rubber pads, noise suppression is not satisfactory because if the pads are made sufficiently soft to absorb vibrations satisfactorily, the necessary rigidity between body and frame is sacrificed. As is well known, the present trend in motor vehicle manufacture is to integral frame and body structures in the interests of rigid construction, light weight and low cost but, that such construction facilitates transmission of vibrations by conducting them directly to the floor pan from the suspension springs, thus adding to the problem of noise suppression of vibrations incited in the body structure via wheel suspension mechanism.

Accordingly, it is an object of the present invention to provide for motor vehicles an improved rear wheel suspension mounting of a character and arrangement to give desired ride characteristics to motor vehicles together with desired suppression of vibration induced body noise.

Another object of the invention is to provide an improved wheel suspension mounting which substantially decreases transmission of vibrations from a spring suspended rear axle to the frame or to the body of a vehicle.

Another object of the invention is to provide an improved mounting and noise suppressor mounting device for vehicle semi-elliptical springs.

Other objects of the invention will become apparent from the following detail description taken in connection with the accompanying drawing in which:

Fig. 1 is a vertical cross sectional view of the spring suspension-noise suppressor, taken through a spring mounting member;

Fig. 2 is an elevational view of one of the spring mounting members;

Fig. 3 is a view similar to Fig. 2 illustrating the function of the mounting;

Fig. 4 is an isometric view of the spring mounting; and

Fig. 5 is a view similar to Fig. 1 showing a modification thereof.

Referring to the drawing by characters of reference my mounting designated generally by the numeral 26 comprises, in general, a mounting plate or holder 94, a resilient mounting member or rubber pad 96, and a movable bearing member 98. The holder 94 retains the rubber pad 96 and the rubber pad carries the bearing member 98 which in turn carries the lateral spring arm 78.

In the interests of low manufacturing costs, I make the mounting holder 94 of sheet metal channel stock having a web or base 100 and top and bottom retainer flanges 102. In position on the side frame members 32, the channel holder 94 extends longitudinally thereof or lengthwise of the vehicle. At the ends of the channel 94, the web 100 thereof may be extended to provide mounting tabs 104 for bolts 106 and the channel-shaped holders may be secured back to back to the channel-shaped side frame members 32. In the present construction, the bolts 106 extend through spacers 108 in the side frame members and through the wheel house panel 52 to receive nuts 110 so that the latter will be accessible from the wheel house for assembly and disassembly purposes.

The rubber pad 96 fits complementary into the channel holder 94 and may be bonded or be otherwise suitably secured to the inner surfaces thereof. In the outer face of the rubber pad 96, I provide a recess 112 to receive the bearing member 98 which is largely embedded in the rubber. The recess 112 is preferably rectangular in shape and the bearing member 98 may be of channel stock having top and bottom flanges 114 and a web 116 securely bonded or otherwise suitably secured to the walls of the recess. Above and below the bearing member 98, I provide parallel recesses 118 in the rubber pad to give greater flexibility thereto for desired vertical movement of the bearing. These grooves 118 also provide upper bumpers 120 and lower bumpers 122 as limit stops to prevent metal to metal contact when severe road obstructions are encountered.

A spring extension or torsion arm 124 extends longitudinally of frame member 32 having one end pivoted thereto and the arm 124 has a portion of the other end thereof fitting complementally with the channel-shaped bearing member 98 of mounting 26. The bearing member 98 and the complementary end portion of arm 124 may be secured together by a bolt 128 or other suitable means. Thus, movement of the arm 124 is dependent upon the flexibility of the rubber. The spring suspension cross member 76 may be connected through the arm 124 to the resilient mounting bearing 98 by securing the ends of the cross member 76 respectively to the arms 124 by rivets 130 or by any other suitable securing means.

When a rear wheel of the vehicle encounters a road irregularity, the front end of the corresponding spring will move arcuately on its mounting pad displacing the rubber to absorb the shock and vibrations including audible vibrations. When the wheel or wheels are encountering ordinary rough roads or slight road irregularities, the cushioning action is done substantially entirely by the rubber pads. This arcuate action of the front ends of the springs on the rubber pads is resiliently opposed by the torsion arms 124 with opposing force corresponding to the severity of the wheel action. When unusually severe road obstacles are met by the vehicle rear wheels, action of the spring front ends is limited by the rubber stops 120, 122 in the mounting pads 96. Whether traversing rough or smooth roads, vibrations originating in the vehicle and incited in the rear axle and transmitted by the springs are suppressed by the rubber pads 96 which materially decrease transmission of the vibrations and resultant noise to the body. As illustrated in Fig. 3, when springs are flexed, the spring end bearing members 98 move down through arcuate paths and displace rubber of pads 96 in the absorption of shocks and audible vibrations.

The modification of Fig. 5 is similar to the mount of Figs. 1 to 4 inclusive and therefore like parts are designated by like characters of reference. The rubber mounting pad 96 between channels 98 and 100 is of channel shape and, like the previously described pad of Fig. 1, has its opposite side surfaces united, as by a bonding process respectively to the webs of the metal channels 98 and 100. The legs or flanges of the rubber pad 96 are also preferably bonded to the flanges of channel 98, but are spaced from the flanges 142 of outer channel 100 to provide the necessary clearance spaces 131 for movement of the inner channel which is resisted only by the soft rubber mounting pad. In order to insure that the clearance spaces 131 do not become clogged with dirt, stones and other foreign matter which might render the mountings ineffective, I form the rubber mounting flanges with outturned portions or lips 132 which overlie and close the entrances to the spaces 131 of the side face of the pad.

I claim:

A resilient mounting for use with a motor vehicle spring suspension comprising, a rigid channel for attachment to one part of the vehicle and having upper and lower horizontal flanges, a resilient channel of rubber-like material fitting complementally into and held by said rigid channel, said resilient channel having top and bottom flanges, a second rigid channel for attachment to another part of the vehicle fitting complementally with and held to said resilient channel having top and bottom flanges respectively spaced from the first channel flanges by the resilient channel flanges, and V-shaped recesses in the end edges of said resilient channel flanges tapering inwardly to an apex at a depth substantially equal to the depth of the second rigid channel flanges, the volume of the V-shaped recess being greater than the mass of the rubber-like material of the inner leg of the V-shaped recess.

References Cited in the file of this patent

UNITED STATES PATENTS

| 1,830,117 | Lee | Nov. 3, 1931 |
| 2,273,869 | Julien | Feb. 24, 1942 |

FOREIGN PATENTS

| 210,639 | Switzerland | Oct. 1, 1940 |
| 526,806 | Great Britain | Sept. 26, 1940 |
| 545,841 | Great Britain | June 16, 1942 |